US00RE35411E

United States Patent [19]

Ashok et al.

[11] E Patent Number: Re. 35,411

[45] Reissued Date of Patent: Dec. 31, 1996

[54] BELT CASTING OF MOLTEN METAL

[75] Inventors: Sankaranarayanan Ashok, West Haven; Harvey P. Cheskis, North Haven, both of Conn.

[73] Assignee: Olin Corporation, New Haven, Conn.

[21] Appl. No.: 277,849

[22] Filed: Jul. 20, 1994

Related U.S. Patent Documents

Reissue of:

[64] Patent No.: 5,131,451
Issued: Jul. 21, 1992
Appl. No.: 628,074
Filed: Dec. 14, 1990

[51] Int. Cl.[6] ..... B22D 23/00

[52] U.S. Cl. ..... 164/46; 164/429; 164/479

[58] Field of Search ..... 164/46, 429, 479; 427/422, 423; 118/302

[56] References Cited

U.S. PATENT DOCUMENTS

| | | | |
|---|---|---|---|
| 3,181,209 | 5/1965 | Smith | 164/46 |
| 3,670,400 | 6/1972 | Singer | 164/46 |
| 3,696,501 | 10/1972 | Darling . | |
| 3,775,156 | 11/1973 | Singer . | |
| 3,826,301 | 7/1974 | Brooks . | |
| 3,909,921 | 10/1975 | Brooks . | |
| 4,577,676 | 3/1986 | Watson . | |
| 4,694,899 | 9/1987 | Wood et al. . | |
| 4,779,802 | 10/1988 | Coombs . | |
| 4,938,278 | 7/1990 | Sankaranarayanan et al. | 164/46 |
| 4,966,224 | 10/1990 | Cheskis et al. . | |
| 4,971,133 | 11/1990 | Ashok et al. | 164/46 |
| 5,074,933 | 12/1991 | Ashok et al. . | |

FOREIGN PATENT DOCUMENTS

| | | | |
|---|---|---|---|
| 242063 | 10/1962 | Australia | 164/429 |
| 0225080 | 12/1987 | European Pat. Off. . | |
| 1379261 | 3/1975 | United Kingdom . | |
| 1472939 | 8/1977 | United Kingdom . | |
| 2010146 | 6/1979 | United Kingdom | 164/429 |

OTHER PUBLICATIONS

Strip Casting Studies at BHP Central Research Laboratories by Herbertson et al 5th Int. Conf. Continuous Casting., Linz, Voest Alpine, Jun. 1990.

Fluid Dynamics in High–Speed Strip–Casting Metal Delivery Systems by J. S. Truelove, T. A. Gray, P. C. Campbell and J. Herbertson. International Conf. on New Smelting Reduction and Near Net Shape Casting Technologies for Steel. BHP Central Research Laboratories, Shortland, NSW, Australia (1990).

The Osprey Preform Process by R. W. Evans, A. G. Leatham and R. G. Brooks, appearing in Powder Metallurgy (1985).

Birth and Recent Activities of Electromagnetic Processing of Materials by Shigeo ASAI, appearing in ISIJ (1989) at pp. 981–992.

A Novel Concept for Metal Delivery to Thin Strip Casters by J. Herbertson, R. L. Guthrie, McGill University, Canada. The Metallurgical Society (1988) appearing at pp. 335–348.

The Osprey Process for the Production of Spray–Deposited Roll, Disc, Tube and Billet Preforms by A. G. Leatham and R. G. Brooks, appearing in Modern Developments in Powder Metallurgy, vol. 15–17 (1985) at pp. 157–173.

(List continued on next page.)

*Primary Examiner*—Kuang Y. Lin
*Attorney, Agent, or Firm*—Gregory S. Rosenblatt

[57] ABSTRACT

A method and apparatus for the casting of metals in which a molten stream of metal is atomized into a spray of highly liquid droplets. The droplets are deposited on a moving substrate such as an endless belt provided with side dams. The droplets flow in a direction transverse to the direction of movement of the substrate and are contained by the side dams. The droplets may have an average size of 300 microns and the spray may have a liquid to solid ratio of at least 50%. This arrangement overcomes the problems of splashing and turbulence caused by the relative flow between the melt and the belt in regular belt casting and overcomes porosity problems associated with spray casting.

8 Claims, 1 Drawing Sheet

OTHER PUBLICATIONS

Ser. No. 07/322,435, Mar. 13, 1989, G. J. Muench (Application).

R. W. Evans et al, "The Osprey Preform Process", Powder Metallurgy, vol. 28, No. 1, 1985, pp. 13–20.

A. G. Leatham et al, "The Osprey Process for the Production of Spray–Deposited Roll, Disc, Tube and Billet Preforms", Modern Developments in Powdere Metallury vols. 15–17, 1985, pp. 157–173.

S. Asai, "Birth and Recent Activities of Electromagnetic Processing of Materials", ISIJ International, vol. 28, 1989, No. 12, pp. 981–992.

J. Herbertson et al, "Strip Casting Studies at BHP Central Research Lab", CCC'90 Fifth Int'l. Casting Conf., Voest Alpine, Industries., Jun. 1990.

J. Herbertson et al. "A Novel Concept of Metal Delivery to Thin Strip Casters"Casting of Near Net Shaped Products, TMS–AMIE, pp. 335–349.

J. S. Truelove et al, "Field Dynamics in High–Speed Strip Casting Metal Delivery System", International Conference on New Smelting Reductions of Near Shape Casting Technologies for Steel, SRNC–9, J. S. Truelove, pp. 1/10–11/10.

BELT CASTING OF MOLTEN METAL

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to the casting of metal and more particularly, this invention relates to the feeding of molten metal onto a flat planar area of a continuously moving casting surface such as a belt.

2. Background Information

The metals industry has been developing processes and apparatus for producing an as-cast product that needs little or no additional processing such as hot rolling to reduce it to strip form. One such process which has arisen as a result of this development effort is the single belt casting process. According to this process, molten metal is caused to flow onto a moving horizontal surface in the form of a continuous belt whereupon it solidifies as it moves along with the belt. The resulting elongated solid strip of metal is removed from the continuous belt for further processing as desired.

Another process that is undergoing development in connection with the casting of strip products is the use of the spray deposition technique of the type basically developed by Osprey Metals Ltd. of West Glamorgan, United Kingdom. The Osprey process, as it is generally known, is disclosed in detail in U.K. Pat. Nos. 1,379,261 and 1,472,939 and U.S. Pat. Nos. 3,826,301 and 3,909,921 and in publications entitled "The Osprey Preform Process" by R. W. Evans et al, Powder Metallurgy, Vol. 28, No. 1 (1985), pages 13–20 and "The Osprey Process for the Production of Spray-Deposited Roll, Disc, Tube and Billet Preforms" by A. G. Leatham et al, Modern Developments in Powder Metallurgy, Vols. 15–17 (1985), pages 157–73.

The Osprey process is essentially a rapid solidification technique for the direct conversion of liquid metal into shaped preforms by means of an integrated gas atomizing/spray-depositing operation. In the Osprey process, a controlled stream of molten metal is poured into a gas-atomizing device where it is impacted by high-velocity jets of gas, usually nitrogen or argon. The resulting spray of metal particles is directed onto a "collector" where the hot particles re-coalesce to form a highly dense preform. The collector is fixed to a mechanism which is programmed to perform a sequence of movements within the spray, so that the desired preform shape can be generated. The preform can then be further processed, normally by hot-working, to form a semi-finished or finished product.

The Osprey process has been proposed for producing strip or plate or spray-coated strip or plate, as discussed in U.S. Pat. Nos. 3,775,156 and 4,779,801 and European Pat. Appln. No. 225,080. For producing these products, a substrate or collector, such as a flat substrate or an endless belt, is moved continuously through the spray to receive a deposit of uniform thickness across its width.

In connection with the conventional belt casting described above wherein the molten metal is poured onto the continuously moving belt, problems have arisen as attempts have been made to increase the speed of casting (as measured in inches per minute of the cast strip), as well as in reducing the thickness of the cast alloys to eliminate further processing operations. Such problems involve splashing and turbulence arising in connection with the feeding of the molten metal onto the belt which is caused by the momentum transfer between the melt and the belt. The belt must be maintained in relatively cool condition in order to extract heat from the melt to cause the solidification thereof. Accordingly, the source of the molten metal is usually spaced at some vertical distance from the belt to prevent it from heating the belt. When the molten metal is caused to flow directly from the source of the molten metal through the vertical distance onto the belt, the melt will tend to splash when it hits the belt which may result in porosity in the cast Product as well as induce turbulence which can cause inclusions such as oxides. Additionally, there is the problem of achieving the spreading or distribution of the melt evenly across the width of the belt which leads to strip with non-uniform cross-section.

A typical approach undertaken in attempt to solve these problems in belt casting involves the use of a feeding means such as a tundish between the source of molten metal and the belt. Such feeding means normally takes the stream of molten metal issuing from the source and discharges it outwardly in the direction of movement of the belt. Although this approach solves the problem of splashing, the problems of proper spreading of the melt and dampening of its flow to reduce turbulence still remains.

The following references contain a discussion of various delivery systems used for the delivery of the melt to belt casters.

J. Herbertson, P. C. Campbell, A. G. Hunt and J. Freeman, "Strip Casting Studies at BHP Central Research Laboratories", CCC'90 Fifth International Casting Conference, Voest Alpine, Industrieanlangenbau, Linz, June, 1990; J. Herbertson and R. I. L. Guthrie, "A Novel Concept of Metal Delivery to Thin Strip Casters", Casting of Near Net Shaped Products, TMS-AIME, pp. 335–349; and J. S. Truelove, T. A. Gray, P. C. Campbell and J. Herbertson, "Fluid Dynamics in High-Speed Strip-Casting Metal Delivery System", International Conference on New Smelting Reduction of Near Net Shape Casting Technologies for Steel, SRNC-9, J. S. Truelove, pp. 1/10–11/10.

In the case of the spray cast process, according to the basic Osprey process, problems have been encountered due to excessive porosity being present in the cast product. This phenomenon, normally undesirable, is a particular problem in a thin gauge product such as strip since the porous region may comprise a significant percentage of the product. The porosity is thought to occur when the initial semi-solid deposit layer contains too much solid or is cooled too rapidly and provides insufficient liquid to feed inherent intersticies between splatted droplets. Porosity is also thought to occur due to entrainment or entrapment of the atomizing gas.

SUMMARY OF THE INVENTION

The present invention is directed to a casting system in which molten metal is supplied to a planar moving surface which overcomes the problems mentioned above. In accordance with the present invention, an apparatus and process are provided which includes a source of molten metal, a continuously moving surface for receiving the molten metal, and atomizing means for atomizing a stream of molten metal into droplets for depositing the droplets onto the moving surface. The conditions for atomization are controlled such that a highly liquid spray is formed which will flow transversely to the movement of the substrate and be contained by edge dams. The deposited metal is solidified as the substrate moves the metal away from the spray being deposited.

With the casting system of the present invention, due to the fact that the deposit is highly liquid, entrapment of gas due to atomization is reduced and entrapped gas can escape. By atomizing the molten stream, problems due to momentum transfer between the melt and the belt are eliminated.

BRIEF DESCRIPTION OF THE DRAWINGS

The present invention will be better understood by reference to the following detailed description and to the accompanying drawings in which.

DETAILED DESCRIPTION OF THE INVENTION

Figure 2:
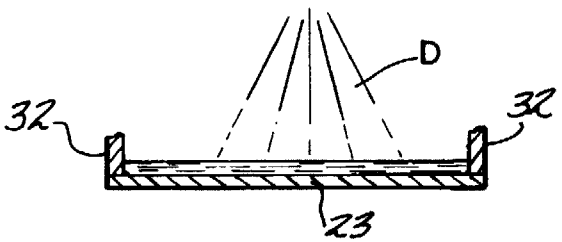
FIG. 2 is a sectional view of the apparatus taken along the lines 2—2 of FIG. 1.
Figure 1:
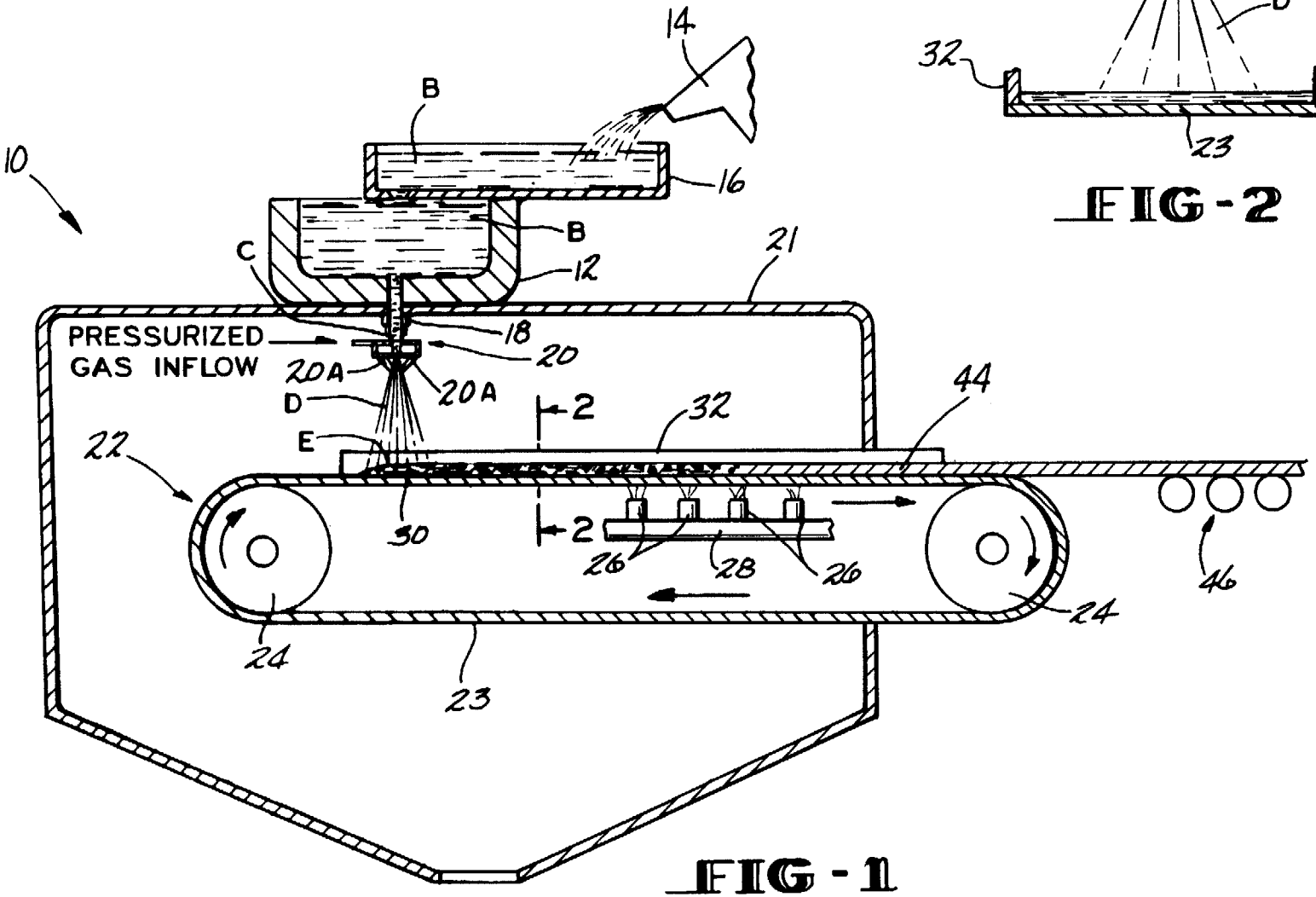
FIG. 1 is a schematic elevational view, partially in section, of a casting apparatus useful in practicing the present invention.

Referring now to the drawings, FIG. 1 schematically illustrates a casting apparatus which is adapted for the continuous formation of metal in strip form. The apparatus 10 employs a tundish 12 in which the metal B is held in molten form. The tundish 12 receives the molten metal B from a tiltable melt furnace 14, via a transfer launder 16, and has a bottom nozzle 18 through which the molten metal B issues in a stream C downwardly from the tundish 12.

An atomizing device 20 employed by the apparatus 10 is positioned below the tundish bottom nozzle 18 within a spray chamber 21 of the apparatus 10. The atomizing device 20 may be a gas atomizer and accordingly is supplied with a gas, such as nitrogen, under pressure from any suitable source. The gas-atomizing device 20 which surrounds the molten metal stream C has a plurality of jets 20A symmetrically positioned about the stream C. The atomizing gas is thereby impacted or impinged on the stream from all sides and directions about the stream so as to convert the stream into a spray D of atomized molten metal particles, broadcasting downwardly from the atomizing device 20 in the form of a divergent conical pattern.

Other types of atomization may be used to produce the spray of droplets in accordance with the present invention. One such other type includes magnetohydrodynamic atomization in which the stream of liquid metal is caused to flow through a narrow gap between two electrodes which are connected to a DC power supply with a magnet perpendicular to the electric field and the liquid metal. This type of atomization is more fully described in the publication entitled "Birth and Recent Activities of Electromagnetic Processing of Materials", Shigeo Asai, ISIJ International, Vol, 28, 1989, No. 12, p. 981–992. Additionally, mechanical-type atomizers such as shown in U.S. patent application Ser. No. 07/322,435, filed Mar. 13, 1989 in the name of George J. Muench may also be used.

A continuous belt arrangement 22 is mounted beneath the discharge opening 16 of the vessel 14. The belt arrangement 22 includes a continuous flexible belt 23 entrained about and extending between horizontally spaced rollers 24. One of the rollers 24 may be connected to a suitable drive means (not shown) to drive the belt 23 at the proper speed in the direction of the arrows shown in FIG. 1. The belt 23 may be made of any suitable material capable of withstanding the temperatures involved, but is preferably made of steel or a high thermal conductivity material such as copper. Water jets 26 connected to a manifold 28 may be provided underneath the upper run 30 of the belt 23 to spray water against the underside of the belt for cooling purposes.

As to be explained below, the atomized spray D is highly liquid as it impinges upon the surface of the belt. Accordingly, edge dams 32 are provided in association with the continuous belt 23 to contain the liquid in a direction transverse to the movement of the belt until it becomes solidified. These edge dams 32 may be stationary with respect to the belt such as depicted in the drawings, or may be of the type which are continuously moveable along with the continuous belt 23. An example of such continuously moveable edge dams is shown in U.S. Pat. No. 4,694,899, issued Sep. 22, 1987.

With the arrangement of the apparatus as shown in the drawings, the stream of molten is atomizer as it passes through the atomizer 20 into a divergent spray pattern D which impinges onto an area 32 of the upper run 30 of the endless belt 23 which underlies the nozzle 20 to form a deposit E of the atomizer metal droplets. The side dams 32 contain the molten metal on the endless belt 23 in the transverse direction of movement thereof. A fraction of the metal droplets may overspray the belt 23 and fall to the bottom of the chamber 22 where they may be collected by suitable means.

The molten metal is carried forward by the belt 23 where it becomes solidified into a continuous strip or slab 44. The strip 44 is separated from the belt 23 and may be either directly coiled or removed on a roller system 46 for further processing.

As mentioned above, the atomizer droplets must be highly liquid at the time they impinge upon or are deposited on the endless belt 23 so that the melt will flow transversely against the edge dams 32 and be contained thereby. It is thought that the spray should contain 50% or more of liquid and preferably 70% or more. The size of the individual droplets may also be important. It has been found that the droplets should be 300 microns or greater.

The advantage of the present invention has been shown by the following example. Copper was used as the molten metal and was poured through an atomizer of the type shown in FIG. 1 at 1200° C. A moveable substrate was formed from 0.0625" thick steel provided with upraised side edges to form side dams. Nitrogen was used as the atomization gas at pressures of 100, 50 and 30 psi. The gas to metal ratios at such gas pressures were approximately 1, 0.6 and 0.4 respectively. To provide an indication of droplet size, the average overspray powder size was determined under the various conditions. Such average powder sizes were approximately 120, 250 and 600 μm respectively for the various gas to metal ratios. It has been determined that overspray particle size is approximately 20 microns smaller than the droplet size. Thus overspray droplet size provides a good indication of actual droplet size. The substrate was located at a distance of 17" from the atomizer for all castings. Examples taken under the various conditions were studied and significant porosity was noted at 100 psi condition with a lesser amount of porosity at 50 psi. When the gas pressure was at 30 psi, providing a droplet size of about 600 microns, no gas or solidification porosity was noted across the whole thickness of the casting.

While the invention as described above was described in connection the use of a continuous belt, the present invention is thought applicable to any moving surface system in which a generally plain or moving deposit area is presented for reception of the spray or molten metal and which is provided with spaced edge dams to contain the molten metal flow in a transverse direction. For example, if only short lengths of a cast alloy is needed, a flat moveable table with side dams could be used in place of a continuous system.

While the invention has been described above with reference to a specific embodiment thereof, it is apparent that many changes, modifications and variations can be made without departing from the inventive concept disclosed. Accordingly, it is intended to embrace all such changes, modifications and variations that fall within the spirit and broad scope of the appended claims. All publications cited herein are incorporated by reference in their entirety.

What is claimed:

1. A method of casting metal [strip] comprising;

providing a moving substrate having edge dams thereon for the containment of the molten metal in a direction transverse to the movement of said substrate, atomizing a stream of molten metal into highly liquid droplets, depositing said spray of droplets; onto said moving substrate with a highly liquid content such that the deposited metal flows in a direction transverse to the direction of movement of the substrate against the edge dams, and causing said deposited molten metal to solidify as said substrate moves the metal in a direction away from the spray being deposited.

2. The method of claim 1 wherein the average size of said droplets is at least 300 microns.

3. The method of claim 1 wherein the liquid to solid ratio of said droplets is at least 50%.

4. The method of claim 2 wherein the liquid to solid ratio of said droplets is at least 70%.

5. An apparatus for the production of [strip] material comprising;

a source of molten metal:

a moveable substrate having side dams associated therewith, atomizing means for atomizing said molten stream into a spray of molten droplets of highly liquid content, said atomizer being positioned such that said spray of droplets are deposited on said moving substrate, said spray being sufficiently deposited so that the molten metal flows transverse to the direction of movement of said substrate against said side dams, and means for causing said deposited metal to solidify as said substrate moves the metal away from the spray being deposited.

6. The apparatus of claim 5 wherein the average size of the droplets produced by said atomizing means is at least 300 microns.

7. The apparatus of claim 5 wherein said atomizing means atomizes said molten metal into droplets having a liquid to solid radio of 50% or greater.

8. The apparatus of claim 6 wherein said substrate system comprises an endless belt having an upper run upon which said droplets are deposited.

* * * * *